United States Patent [19]
Panagrossi

[11] 3,805,828
[45] Apr. 23, 1974

[54] FLAPPER-TYPE CHECK VALVE
[75] Inventor: Ahmed Panagrossi, Hamden, Conn.
[73] Assignee: Quantum, Inc., Wallingford, Conn.
[22] Filed: Jan. 5, 1973
[21] Appl. No.: 321,221

[52] U.S. Cl. ............ 137/525.3, 137/525.7, 251/368
[51] Int. Cl. .................... F16k 15/03, F16k 15/16
[58] Field of Search ............ 137/525, 525.3, 525.7, 137/525.5; 251/368

[56] References Cited
UNITED STATES PATENTS
| | | | |
|---|---|---|---|
| 73,038 | 1/1868 | Pollard | 137/525.7 |
| 3,325,673 | 6/1967 | Lindahl et al | 251/368 |
| 1,992,495 | 2/1935 | Lynde | 137/525.7 |
| 2,386,485 | 10/1945 | Longeneckel | 137/525.7 X |

*Primary Examiner*—William R. Cline
*Attorney, Agent, or Firm*—Steward & Steward

[57] ABSTRACT

There is disclosed a check valve element for a valve assembly in which an annular gasket portion of resilient sheet material serves as the seal between complementary valve housing sections and incorporates an integrally hinged tongue extending radially inward of the gasket portion. A separate disc portion, carried by the tongue, serves as a port-closing flapper or check valve.

9 Claims, 5 Drawing Figures

FLAPPER-TYPE CHECK VALVE

BACKGROUND OF THE INVENTION

This invention relates to fluid check valves and more particularly to valves of that type which utilize component parts fabricated of polytetrafluoroethylene resins to obtain better service life in highly corrosive fluid media.

Check valves have been available for some time which employ a port closing plug of polymerized tetrafluoroethylene resins, such as Teflon or Fluon or similar brand names. Such material is particularly desirable because of its extreme corrosion resistance, while at the same time affording a degree of resiliency and good valve seating properties which are hard to duplicate in other materials. These valves however are relatively expensive and there is an economic problem in stocking an adequate inventory of different sizes to meet a variety of industrial applications, all of which has restricted their utilization. One of the problems encountered arises from the way the flapper elements are made, in that they consist of a relatively thin tongue portion into which is integrally molded a substantially thicker plug portion. The molding of fluorinated polymer resins to provide different thicknesses in adjacent sections is troublesome, especially where resiliency requirements of the adjacent sections must vary substantially. Thus a needed flexibility in the tongue section may be technically difficult to mold adjacent a heavy plug portion, since the molding of fluorinated polymer resins involves a rather complicated procedure of preforming the resin mix, sintering, and then cooling or quenching it. The problem is made more difficult where it is desired to incorporate fabric or other strand reinforcement in the gasket and tongue portions. Thus the conventional check or flapper elements have been severely limited in respect to maximum size and variation in thickness configuration.

SUMMARY OF THE INVENTION

The primary objective of this invention is to provide simpler and less expensive polytetrafluoroethylene resin flapper components for check valves. To this end the invention involves forming the check or flapper element as a composite structure consisting of a gasket portion and integral resilient tongue section whose thickness and resiliency is determined solely by the flexing and sealing requirements, while a port closing portion is fabricated separately and mechanically attached to the tongue section. This makes it possible economically to produce valve elements for a wide variety of operating conditions, valve sizes, etc., without limitation by the inherent parameters of the molding process. The thicker or heavier plug section may thus be separately molded or machined and mechanically attached to the free end of the flapper tongue. Thus, both the gasket as well as the plug portions can be preformed in standard sizes and combined in various combinations to provide a series of valve elements for check valves of different housing and port sizes, and for different operating pressures by varying the resiliency of the tongue section. Furthermore the arrangement affords a completely non-metallic valve element ideally suited for service in high corrosion environment.

The invention is illustrated by the check valve shown in the accompanying drawings in which.

Figure 1:
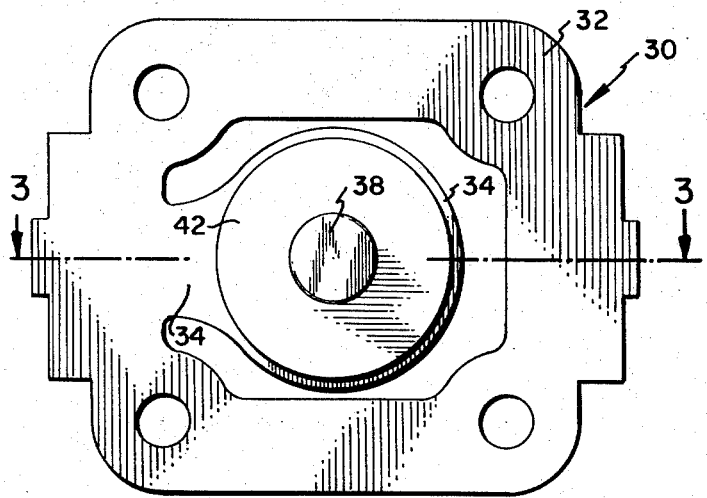
FIG. 1 is a plan view of a combined gasket and flapper element.
Figure 4:
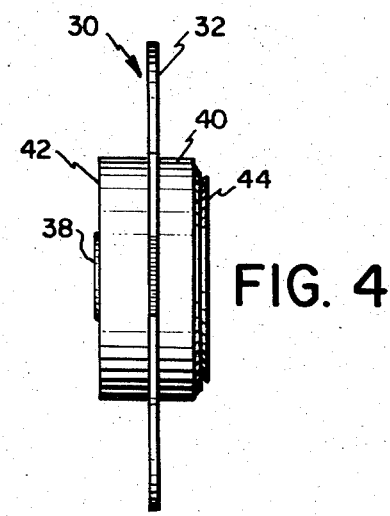
FIG. 4 is a view in end elevation of the valve element seen in FIG. 1.
Figure 2:
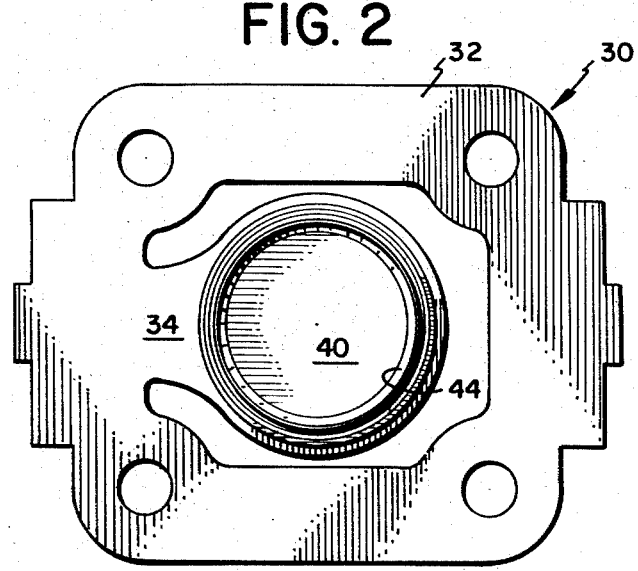
FIG. 2 is a similar view, looking at the opposite face of the element.
Figure 5:
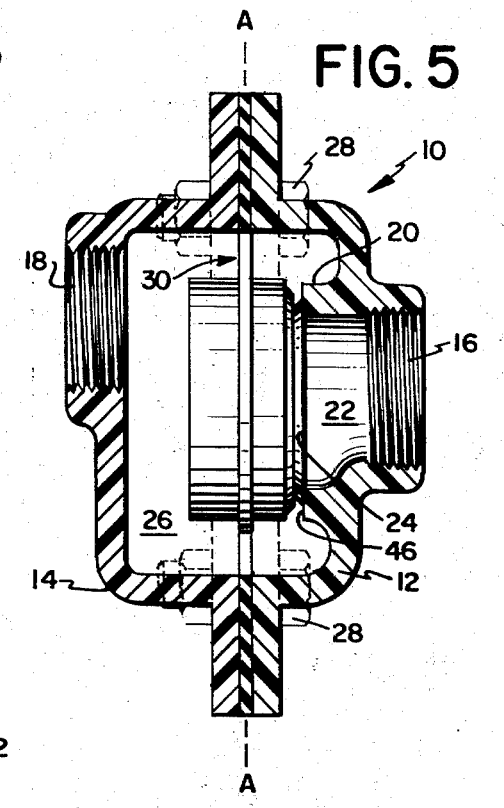
FIG. 5 is a sectional view of a typical check valve assembly incorporating the flapper assembly of FIG. 1.
Figure 3:
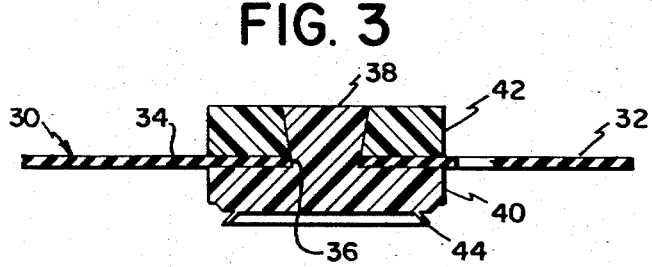
FIG. 3 is a side elevational view in section on line 3—3 of FIG. 2.

As seen in FIG. 5, a check valve assembly 10 comprises a split housing consisting of complementary sections 12, 14 which are joined along part line A—A to form an enclosure within which the valving elements are disposed. Housing section 12 is formed with an inlet opening 16, while an outlet opening 18 is provided in housing section 14. A partition 20, in this instance an annular wall surrounding inlet opening 16, forms a chamber 22 having a port 24 providing communication to an outlet chamber 26 and outlet opening 18. Port 24 is adapted to be closed by a flapper valve element designated generally at 30 and shown in more detail in FIGS. 1 through 4 of the drawings. Bolts 28 clamp the housing sections 12 and 14, as well as the flapper valve element 30, in assembled condition.

As seen in FIGS. 1 through 4, flapper valve element 30 is composed of a gasket portion 32 which may be die cut from resilient, pliable sheet plastic stock. The sheet stock may be reinforced with fabric or strand material, such as fiberglass, or may even be metal reinforced. Gasket 32 is of annular shape with an integrally formed free hinging tongue section 34 extending radially inwardly of the annulus. A hole 36 is formed in the free end of the tongue to provide for attachment of valve plug or disc 40. A post or hub is formed integrally on one face of disc 40 to project through hole 36, and a retaining ring 42 frictionally engages the projecting hub to sandwich tongue 34 between the disc and ring. Preferably hub 38 is tapered outwardly, and the receiving aperture of retaining ring 42 is tapered in complementary fashion to provide an interference fit for locking them together. A sealing lip 44 of thin section to afford some resiliency is formed on the free face of disc 40. Tongue 34 extends into overlying relation to valve port 24, and hole 36 is positioned to cause disc 40 and its sealing lip 44 to cooperate with the annular seat 46 surrounding port 24. Gravity and/or bias molded into tongue 24, acting in conjunction with reverse fluid pressure, is utilized to maintain sealing engagement between sealing lip 44 and valve seat 46. In forward fluid flow, the sealing lip of disc 40 is unseated by flexing of tongue 34.

The flapper valve construction described has the advantage that different sizes and weights of discs 40 can readily be substituted on a given gasket portion, thus making it easy to provide a flapper element best suited to the particular needs. Such variables as stiffness or resiliency of the tongue member, weight and/or size of the disc portion, can be accommodated economically and quickly, without having to maintain a large stock of flappers as has been necessary with the conventional one-piece assemblies. The fabrication of the flapper element in separable parts enables optimum design characteristics of material, thickness, and resiliency, natural bias, etc. to be used, without regard for limitations that are introduced by forming the disc portion integrally with the tongue. Molding limitations, particularly with polytetrafluoroethylene resins, are thus virtually eliminated.

What is claimed is:

1. A valve element for a check valve assembly, comprising a gasket portion of resilient sheet material in the shape of an annulus with an integrally formed free-hinging tongue extending radially inwardly of said annulus, a hole in the free end of said tongue, a disc member having an integral hub projecting from one of its faces and passing through the hole in said tongue, detent means formed on said hub and separable retaining ring means engaging said hub detent means on the side of said tongue opposite said disc to retain said disc thereon, said disc being formed on its free face with a sealing surface adapted for coaction with a valve seat in a valve assembly.

2. A valve element as defined in claim 1, wherein said gasket member, disc, hub and retaining ring means are all fabricated of polytetrafluoroethylene resin.

3. A valve element as defined in claim 2, wherein at least one of said disc and retaining ring members is substantially thicker than the sheet material of said gasket and tongue portion.

4. A valve element as defined in claim 1, wherein said hub tapers axially outwardly towards its free end to provide said detent means, said retaining ring being axially tapered along its internal surface to provide an interference fit with said hub.

5. A valve element as defined in claim 1, wherein at least one of said disc and ring members is of substantially greater thickness than the sheet material of said gasket and tongue portion.

6. In a check valve assembly, a valve housing formed of complementary sections secured together along a part line to provide an enclosure, an internal partition separating said enclosure into inlet and outlet chambers, said partition having a port providing communication between said chambers, and a valve seat formed in the periphery of said port, a fluid inlet in said housing leading to said inlet chamber and a fluid outlet leading to said outlet chamber, a valve element disposed in one of said inlet and outlet chambers and comprising an annular gasket portion of resilient sheet material disposed at the part line between said complementary housing members, said gasket portion having an integrally formed hinging tongue extending radially inwardly of the annular gasket to cause the free end thereof to overlie said port in said partition wall, a hole in the free end of said tongue, a disc member having a hub projecting integrally from said disc and having detent means formed thereon, said hub passing through the hole in said tongue, and a separable retaining ring engaging said hub detent means on the opposite side of the tongue of said disc to retain said disc on said tongue, said disc being formed on its free face with a sealing surface coacting with said valve seat in said valve housing partition.

7. A check valve assembly as defined in claim 6, wherein said gasket member, disc and retaining means are all formed of polytetrafluoroethylene resin.

8. A valve assembly as defined in claim 7, wherein said disc hub is tapered axially outwardly towards its free end to provide said detent means, and said retaining ring is similarly tapered internally to form an interference fit with said hub.

9. A valve assembly as defined in claim 8, wherein at least one of said disc and retaining ring members is substantially thicker than the sheet material of said gasket and tongue portion.

* * * * *